(12) United States Patent
Warren et al.

(10) Patent No.: US 9,742,179 B2
(45) Date of Patent: Aug. 22, 2017

(54) CONDUIT AND END FITTING FOR OFFSHORE CABLE ASSEMBLY

(71) Applicant: Amphenol Corporation, Wallingford, CT (US)

(72) Inventors: John D. Warren, Orange, CA (US); Ben J. Reed, Surfside, CA (US)

(73) Assignee: Amphenol Corporation, Wallingford, CT (US)

( * ) Notice: Subject to any disclaimer, the term of this patent is extended or adjusted under 35 U.S.C. 154(b) by 96 days.

(21) Appl. No.: 14/625,875

(22) Filed: Feb. 19, 2015

(65) Prior Publication Data

US 2016/0248238 A1    Aug. 25, 2016

(51) Int. Cl.

| | | |
|---|---|---|
| H01R 4/00 | (2006.01) |
| H02G 3/06 | (2006.01) |
| H02G 15/08 | (2006.01) |
| H02G 3/18 | (2006.01) |
| H02G 9/06 | (2006.01) |
| F16L 1/20 | (2006.01) |
| F16L 35/00 | (2006.01) |
| F16L 57/00 | (2006.01) |
| F16L 58/18 | (2006.01) |
| H02G 3/04 | (2006.01) |
| F16L 11/22 | (2006.01) |
| F16L 33/22 | (2006.01) |
| F16L 33/24 | (2006.01) |

(52) U.S. Cl.
CPC ............... *H02G 9/06* (2013.01); *F16L 1/20* (2013.01); *F16L 11/22* (2013.01); *F16L 33/22* (2013.01); *F16L 33/24* (2013.01); *F16L 35/00* (2013.01); *F16L 57/005* (2013.01); *F16L 58/18* (2013.01); *H02G 3/0481* (2013.01)

(58) Field of Classification Search
CPC ...... H02G 15/02; H02G 3/0616; H02G 3/083; H01B 7/183; H01B 7/20; H01B 7/40; H01B 7/365; H01B 7/366
USPC ............ 174/84 S, 107, 110 AR, 116, 117 A; 285/129.2, 149.1
See application file for complete search history.

(56) References Cited

U.S. PATENT DOCUMENTS

| | | | | |
|---|---|---|---|---|
| 2,200,967 A | * | 5/1940 | Phillips .................. | B60T 17/04 174/47 |
| 2,681,781 A | * | 6/1954 | Kellems ............... | H02G 3/0666 174/81 |
| 3,280,908 A | * | 10/1966 | Todd ....................... | E21B 7/128 174/47 |
| 3,766,307 A | * | 10/1973 | Andrews, Jr. ........ | G02B 6/4415 174/101.5 |
| 4,196,307 A | | 4/1980 | Moore et al. | |
| 4,198,537 A | * | 4/1980 | Mariani ............... | H02G 3/0691 174/51 |

(Continued)

FOREIGN PATENT DOCUMENTS

JP    2250212 A    10/1990

*Primary Examiner* — Chau N Nguyen
*Assistant Examiner* — Roshn Varghese
(74) *Attorney, Agent, or Firm* — Blank Rome LLP; Charles R. Wolfe, Jr.; Tara L. Marcus (57) ABSTRACT

A conduit for an offshore cable assembly that includes a conduit body that has at least one longitudinal strength member embedded therein. The at least one longitudinal strength member extends the length of the conduit body. A plurality of cables, hoses, or a combination are received inside of the conduit body.

7 Claims, 5 Drawing Sheets

(56) References Cited

U.S. PATENT DOCUMENTS

| | | | | |
|---|---|---|---|---|
| 4,402,069 | A | * | 8/1983 | Miller .................... G01V 1/201 |
| | | | | 174/101.5 |
| 4,563,540 | A | * | 1/1986 | Bohannon, Jr. ........ H01B 7/202 |
| | | | | 174/105 R |
| 4,644,097 | A | | 2/1987 | Johnsen et al. |
| 4,767,891 | A | * | 8/1988 | Biegon ................ H01B 7/0876 |
| | | | | 174/112 |
| 5,261,021 | A | * | 11/1993 | Pasta ................... G02B 6/4416 |
| | | | | 174/23 R |
| 6,467,820 | B1 | * | 10/2002 | Albrecht ................ F16L 23/02 |
| | | | | 285/125.1 |
| 6,715,798 | B2 | * | 4/2004 | Albrecht ................ F16L 23/02 |
| | | | | 285/124.1 |
| 6,902,138 | B2 | * | 6/2005 | Vantouroux .......... F16L 3/1091 |
| | | | | 248/68.1 |
| 8,590,148 | B2 | | 11/2013 | Dodwell et al. |
| 2007/0102845 | A1 | * | 5/2007 | Dodwell .............. B29C 39/021 |
| | | | | 264/272.11 |
| 2009/0188694 | A1 | * | 7/2009 | Pereira ................ H02G 3/0468 |
| | | | | 174/112 |
| 2010/0122831 | A1 | | 5/2010 | Watanabe |
| 2013/0062093 | A1 | | 3/2013 | Bodziony et al. |
| 2014/0262413 | A1 | | 9/2014 | McCleary et al. |

* cited by examiner

CONDUIT AND END FITTING FOR OFFSHORE CABLE ASSEMBLY

FIELD OF THE INVENTION

The present invention relates to a cable assembly for use in an offshore environment. The present invention also relates to the conduits and end fittings associated with the cable assembly.

BACKGROUND OF THE INVENTION

Oil and gas industry equipment and machinery, such as drilling rigs, are often located offshore. Certain offshore installations utilize a tender-assist vessel, which is a secondary platform that contains power, controls, and utilities not included on the main platform. Umbilicals or cables sometimes including hoses are used to transmit electrical power, signals and/or air/hydraulic fluids from the tender-assist vessel to the main platform. These signals and/or fluids can be used to convey power, control and/or instrumentation necessary in drilling applications. However, due to the harsh environment and the weight and length of the umbilicals or cables, the umbilicals or cables and their end fittings are often damaged in traditional installations and when handling. U.S. Pat. No. 8,590,148 to Dodwell et al. discloses a conventional conduit assembly method, the subject matter of which is herein incorporated by reference.

Therefore, a need exists for a ruggedized cable assembly suitable for the offshore environment.

SUMMARY OF THE INVENTION

Accordingly, the present invention provides a conduit for an offshore cable assembly that includes a conduit body that has at least one longitudinal strength member embedded therein. The at least one longitudinal strength member extends the length of the conduit body. A plurality of cables, hoses, or a combination are received inside of the conduit body. In one preferred embodiment, a retaining wrap may surround the plurality of cables, hoses, or a combination thereof. In another preferred embodiment, a bonding section may be disposed between the conduit body inner surface and the plurality of cables, hoses, or a combination thereof.

The present invention may also provide a conduit and end fitting subassembly for an offshore cable assembly that includes a conduit configured for offshore use and supporting at least one of a cable or hose. The conduit has a conduit body and an end. The conduit body includes at least one longitudinal strength member embedded therein. The at least one longitudinal strength member extends substantially the length of the conduit body. An end fitting is configured to terminate the end of the conduit. The end fitting has a mounting flange and an insert extension that extends therefrom with a transition shoulder between the mounting flange and the insert extension. The end fitting has a cover member covering the insert extension. The conduit body is sandwiched between the insert extension and the cover member, thereby coupling the conduit and end fitting.

The present invention may yet further provide an offshore cable assembly that includes a plurality of conduits that supports a plurality of cables, hoses, or combination thereof. Each conduit includes a conduit body that has an end and at least one longitudinal strength member embedded therein. The at least one longitudinal strength member extends substantially the length of the conduit body. A plurality of end fittings are configured to terminate the ends of each of the conduits. Each of the end fittings has a mounting flange and an insert extension extending therefrom, and each of the insert extensions extends into each of the conduit bodies, respectively. A clamp secures together the plurality of conduits. The clamp includes a plurality of first curved pieces and a plurality of second curved pieces corresponding to the first curved pieces and adapted to be fastened thereto such that each conduit body is captured between one of the first curved pieces and one of the second curved pieces.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Referring to FIGS. 1-7, the present invention generally relates to a cable or umbilical assembly 100 for offshore applications, such as a tender assist vessel or platform for offshore main platforms in which the cable assembly is configured and ruggedized to extend from a tender assist vessel, barge or platform to a main platform, to provide electrical (and/or hydraulic) power, utilities and control and/or instrumentation to that main platform. The present invention also relates to the structure of the conduits 110 and end fittings 120 associated with the cable assembly 100. The present invention utilizes a flange and hose-style conduit assembly as an "external" strength member, which uniformly supports and protects the internal cables. This has multiple distinct advantages relative to existing umbilical solutions: 1) since the conduit includes said strength members, the cables contained within the conduit are not exposed to tensile loads, 2) the flanges applied on either end of the conduit allow for easier and faster installation as well as replacement/maintenance, 3) the conduit (external strength member) protects the internal cable(s) from abrasion, harsh environments and mechanical damage.

Figure 3:
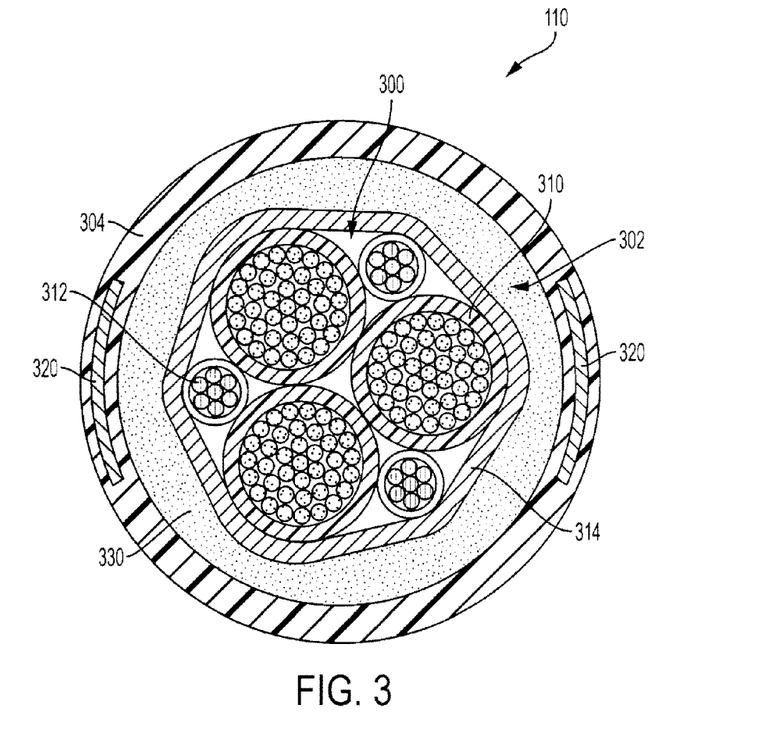
FIG. 3 is a cross-sectional view of the conduit illustrated in FIG. 2 taken along line 3-3.

The cable assembly 100 includes a bundle of conduits 110 that each holds cables and/or hoses 300 in its core 302 for transporting the electrical power, signals, utilities and/or fluids to the main platform. The core 302 of the conduits 110 can support a variety of cables and/or hoses 300 in any combination thereof as desired. For example, one or more of the conduits 110 may support a plurality of power cables 310 combined with a plurality of grounding wires 312, as seen in FIG. 3, to provide power to the main platform. The conduits 110 may also support coaxial or fiber optic cable for providing data communications to the main platform or hoses to provide hydraulic power and/or control to the main platform.

There are certain considerations that are preferably taken into account when selecting the cables or hoses 300 to be supported by the conduits 110. For example, the cable/hose diameters may be considered to select the correct number and size of cables so that they can all fit comfortably within the inner diameter of the conduit 110, which is typically about 4 to 6 inches. Much smaller cable diameters are less efficient and result in a lighter weight such that the cable assembly could be blown about or snagged or otherwise damaged. Much larger cable diameters may make the cable assembly too heavy and unwieldy. If one or more of the conduits is carrying power cables, it is preferred that larger amounts of current carried on the power cables not be run alongside sensitive instrumentation cable. For example, a Variable Frequency Drive (VFD) power cable should not be co-located with a shielded instrumentation cable, because the power cables can induce electrical noise in the instrumentation cable. In that case, it is preferred to separate the power cables into their own conduits. Any remaining cables can be further divided into control cable (generally thicker gage, less sensitive to noise) and instrumentation cable (generally thinner gage, requiring shielding due to susceptibility to noise). Those control and instrumentation cables can then be separated into their own conduits.

Each of the conduits' core 302 may include a retaining wrap 314 that wraps around the cables 300, such as the power cables 310 and grounding wires 312, as seen in FIG. 3. The retaining wrap 314 may be helically or longitudinally wrapped around the power cables 310 and grounding wires 312. The retaining wrap 314 can be a conductive shield, such as foil or braided wire and the like.

Each conduit 110 includes a conduit body 304 protecting the core of cables 300. Each conduit 110 is preferably constructed from a reinforced rubber compound and includes one or more longitudinal strength members 320 embedded in the conduit body 304. In a preferred embodiment, each conduit body 304 includes first and second longitudinal strength members 320 embedded in opposing sides of the conduit body 304, as seen in FIG. 3. Or, in another embodiment, it may include a single longitudinal strength member, wrapped completely around the circumference of the conduit. Each strength member 320 may be a longitudinal segment preferably made of any high strength material, such as aramid or like material. The preferred material for the longitudinal strength members 320 can be any number of fabric-like materials that limit elongation. That is, the strength members 320 are configured to limit the elongation of the conduit under loading. Multiple of the cable assemblies may be installed as a system and the whole system will move dynamically in the offshore environment. As the system experiences waves, wind, etc., the cable assemblies will sway and move such that at certain times, some conduits may bear more than just their own weight. That is, because the cable assemblies are typically strapped together, one conduit may bear some of the load of neighboring conduits. The longitudinal strength member or members 320 reinforce the conduits by providing additional strength to the conduit so that when additional loads are imposed, the individual conduits 110 will not fail.

Figure 4:
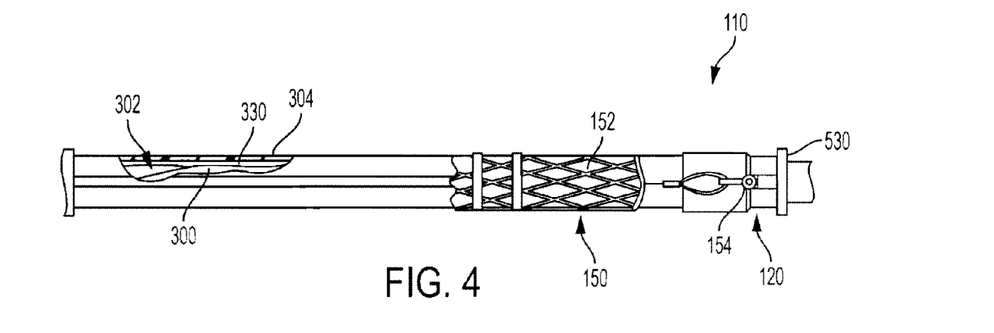
FIG. 4 is a side elevational view of the conduit illustrated in FIG. 2, showing a portion of the conduit cut away.

The cable core 302 of each conduit 110 has a smaller outer diameter than the inner diameter of the conduit, as seen in FIG. 4, which allows the cables and/or hoses to be pulled through each conduit 110. An elongated bonding section 330 (FIGS. 1 and 3) is preferably provided in that area between the retaining wrap 314 and the inner surface of the conduit body 304 to secure the core of cables inside the conduit. The elongated bonding section 330 holds the cables and hoses 300 in place inside the conduit. The elongated bonding section 330 is preferably applied to both ends of the conduit. The bonding section 330 may be any adhesive. When the adhesive cures, it secures the cables in position relative to the conduit 110 and thus holds the cables in place therein. The longer or elongated bonding section 330 provides greater shear strength to the cable assembly 100. In a preferred embodiment, the elongated bonding section 330 is about 3-10 feet, preferably 5 feet.

In one embodiment, the conduits 110 may be water proof. The conduit bodies 304 of the conduits 110 may include an inner tubing and an outer jacket to provide the water proofing. The inner tubing may be black nitrile, for example, which is water-tight such that the adhesive between the inner tubing and the cable core 302 of the conduit does not leak out or environmental elements do not seep in. The outer jacket covering the conduit body 304 may be a water proof material preferably selected for its abrasion resistance, chemical resistance and other properties, such as flame resistance.

Figure 1:
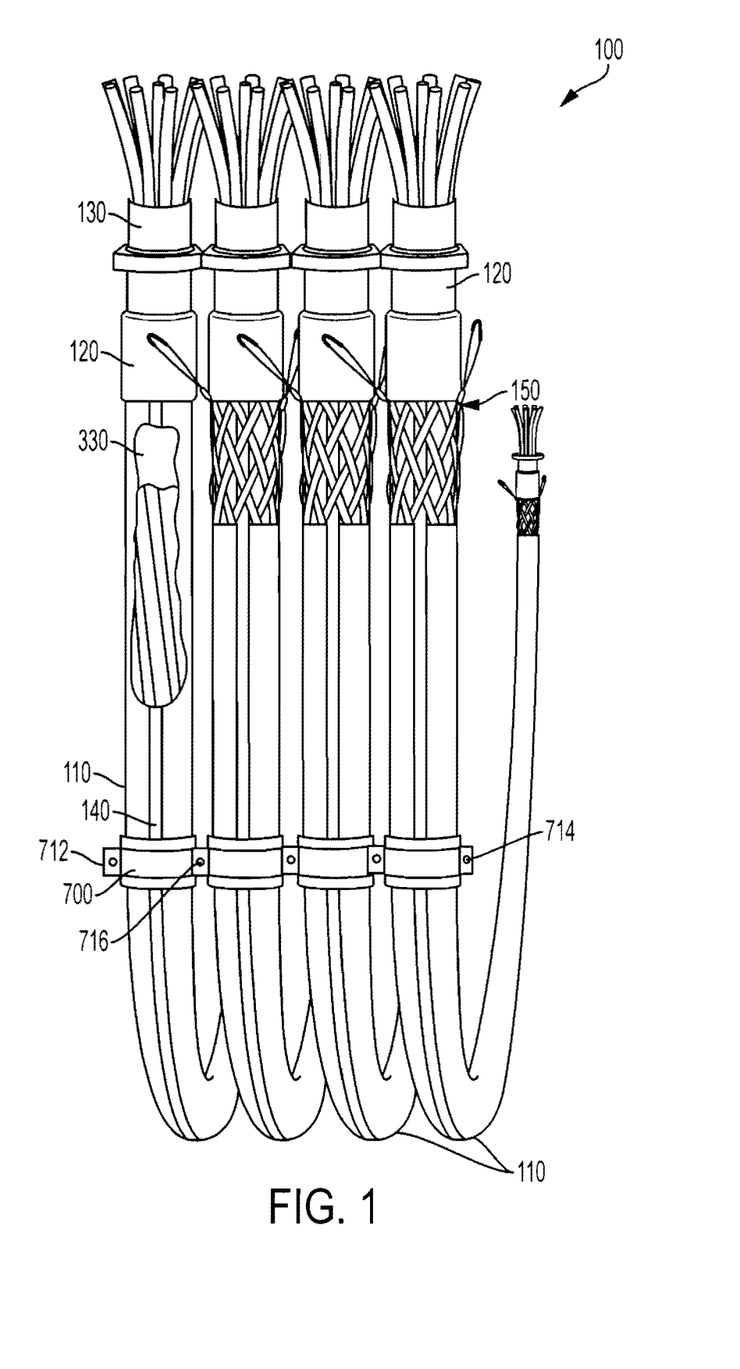
FIG. 1 is a perspective view of an offshore cable assembly in accordance with an exemplary embodiment of the present invention.
Figure 2:
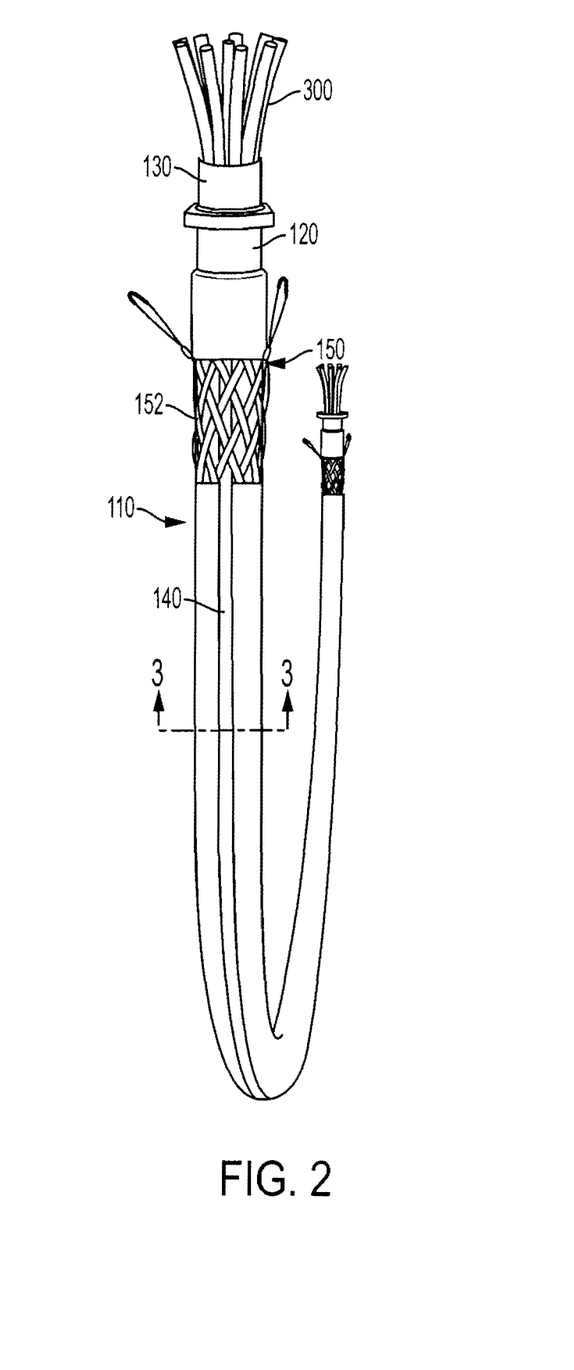
FIG. 2 is a perspective view of a conduit and end fitting subassembly of the cable assembly illustrated in FIG. 1.
Figure 5:
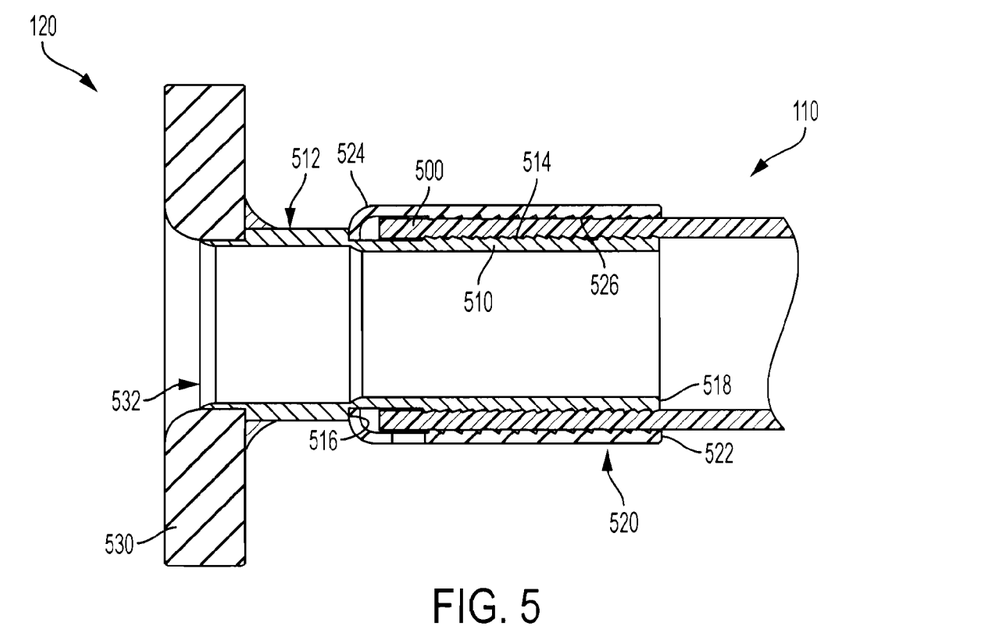
FIG. 5 is a partial cross-sectional view of the conduit and end fitting subassembly illustrated in FIG. 2.

Each end of the conduits 110 is preferably terminated by an end fitting 120 for mounting the cable assembly 100, as seen in FIGS. 1 and 2, to a fixture for installation on the tender-assist and or main platform. The end fittings 120 are preferably made of a metal material. Each end fitting 120 includes an insert extension 510, a cover member 520, and a mounting flange 530, as best seen in FIG. 5. The insert extension 510 extends from a transition shoulder portion 512 between the mounting flange 530 and the insert extension 510 and is sized to be received inside the end 500 of the conduit 110 and preferably includes threads or barbs 514 on its outer surface that grip the inner surface of the conduit. The shoulder portion 512 has an outer diameter that is slightly larger than the outer diameter of the insert extension 510, thereby forming a stopping surface 516. The cover member 520 covers the end 500 of the conduit 110 and the insert extension 510 and includes a distal end 522 that is generally aligned with the end 518 of the insert extension. An opposite end 524 of the cover member 520 abuts the stopping surface 516 of the transition shoulder portion 512. The cover member 520 preferably includes threads or barbs 526 on its inner surface for gripping the outer surface of the conduit's end 500.

To secure each end fining 120 to the ends 500 of the conduits 110, the inner diameter of the insert extension 510 may be expanded, such as by using an expansion tool, such that the inner diameter of the insert extension 510 is generally consistent with the inner diameter of the transition shoulder portion 512. That expansion of the insert extension 510 grips the conduit end 500 between the insert extension 510 and the cover member 520.

Figure 6:
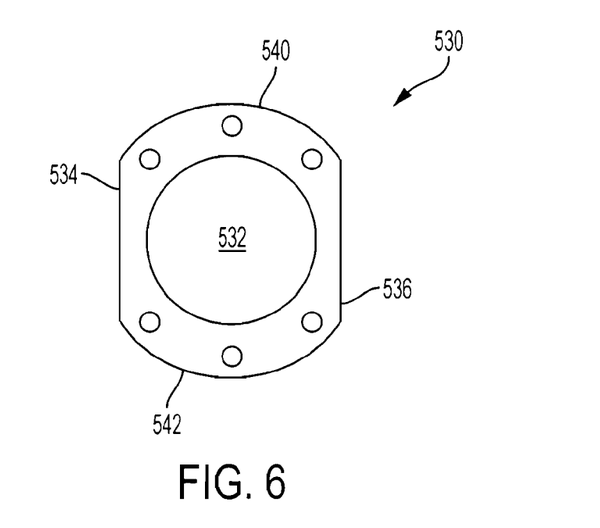
FIG. 6 is a cross-sectional view of a mounting flange of the conduit and end fitting subassembly illustrated FIG. 3.

As seen in FIG. 5, the mounting flange 530 includes a central opening 532 in communication with the insert extension 510, to allow the core of cables 302 (FIG. 3) to extend through the mounting flange 530. The mounting flange 530 preferably includes opposite sides 534 and 536 that are substantially flat, as seen in FIG. 6. The substantially flat sides 534 and 536 allow tighter bundling of the conduits 110 into the cable assembly 100, as seen in FIG. 1, where the substantially flat sides 534 and 536 of neighboring or adjacent conduits 110 abut or nearly abut one another, thereby eliminating unnecessary space therebetween. Extending between the substantially flat sides 534 and 536 are substantially curved sides 540 and 542 which include a plurality of mounting bores 544 arranged around the central opening 532 near each of the curved sides 540 and 542, as seen in FIG. 5. These mounting bores allow the mounting flange to be installed into a fixture that holds the conduits in place on the main platform and tender assist platforms. A strain relief member 130 (FIGS. 1 and 2) may be provided with the end fitting 120 and extending from the mounting flange 530 in a direction away from the insert extension 510. The strain relief may be made of any reasonably flexible material such as rubber, plastic or the like. The strain relief member 130 provides protection against the cables and/or hoses of the conduit 110 from exceeding their minimum bend radius when exiting the mounting flange 530.

In one embodiment, each conduit 110 may include alignment indicia 140 on its outer surface, as seen in FIGS. 1 and 2. The alignment indicia 140 may be one or more lay line marking or strip of material on the conduits' outer surface down the length of the conduit 110. The alignment indicia 140 may include identifying markings, such as brand name, lot code, etc. The alignment indicia 140 provides a visual indicator of the orientation of the conduit 110. The mounting flanges 530 of the end fittings 120 are used to mount the conduits to its installation bracket (not shown). The installation bracket is usually a large piece of fabricated metal that is made to accept and hold in place the flanges of each of the conduits. This bracket secures all the flanges and then, by a hoist point at the top of the bracket can be lifted into place and secured, usually hanging off the side of the oil drilling and tender assist platforms. There will usually be one bracket at each end of the umbilical assembly: one for the main platform side and one for the tender assist platform side. The mounting bores 544 are aligned with the installation bracket and secured with bolts. The lay lines 140 can be aligned with the mounting bores 544 so that, when the conduit is bolted to its installation bracket there is a visual indication, by the position of the lay lines 140, that the conduit has been installed in the proper orientation. The lay lines 140 can be positioned on the outside of the conduit as a visual indicator of where the longitudinal strength members 320 are installed, for example directly underneath the lay line, at 90 degrees from the lay line or otherwise. An installer can see the external lay lines 140 and know where the internal reinforcement is and then attach the flanges 530 onto the conduit in the right position so that, when the cable assembly 100 is ultimately installed in the system, the key features are aligned properly.

In another embodiment, a secondary retention member 150 may be used to retain the ends 500 of the conduits 110 with the end fittings 120, as seen in FIGS. 1, 2 and 4. The retention member 150 may be a KELLEM type grip which includes a wire-weave 152 that is wrapped around the circumference of the conduit. The wire-weave 152 can be used to pull, position, or relieve strain on the conduits. One end of the grip 150 is secured by one or more shackles 154 to the end of the flange 530, as best seen in FIG. 4. If the conduit 110 slips at all relative to the flange 530, the wire-weave 152 of the grip 150 tightens around the conduit 110 to secure it in place.

Figure 7:
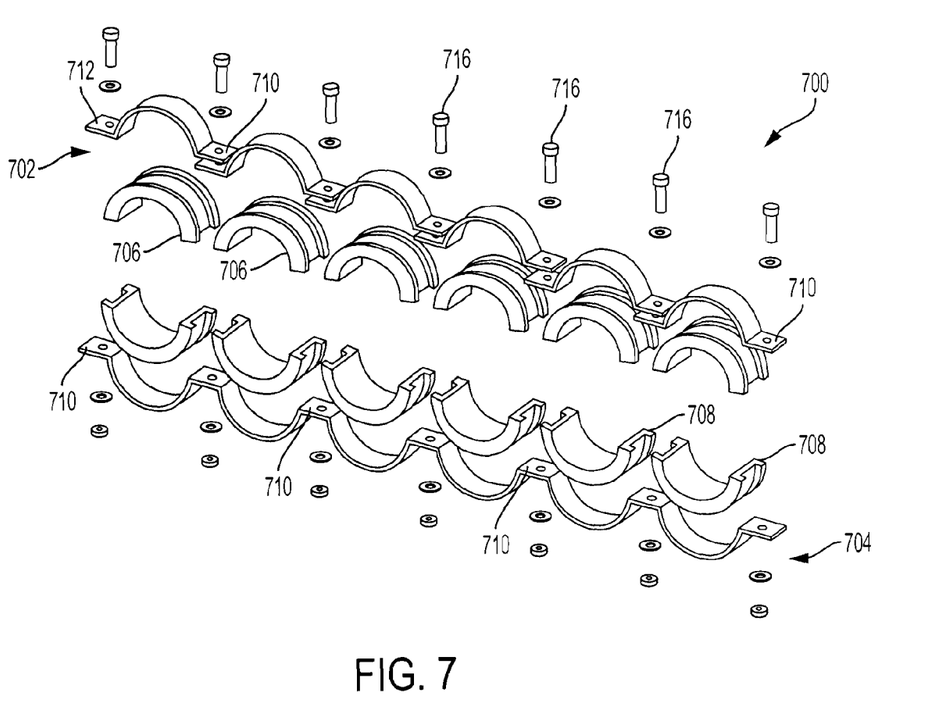
FIG. 7 is an exploded perspective view of clamps illustrated in FIG. 1.

The cable assembly 100 preferably includes a plurality of clamps 700 for bundling together the conduits 110 of the assembly 100. Each clamp 700 is configured to eliminate damage to the cable assembly 100 that may be otherwise caused by fretting, impact, twisting or other interaction between the multiple conduits 110. The clamp 700 generally includes a first set of curved pieces 702 and a second set of curved pieces 704, as best seen in FIG. 7. The first and second sets of curved pieces 702 and 704 correspond to one another to capture the individual conduits 110 therebetween. The clamp 700 may include protective sleeves 706 and 708 between the curved pieces 702 and 704 and the conduits 110. Each of the first and second sets of curved pieces 702 and 704 may be either one continuous piece or individual pieces coupled together. The curved pieces 702 and 704 include fastener holes 710 at either end 712 and 714 and between the conduits 110. Fasteners 716 extend through the corresponding holes 710 to clamp the conduits 110 between the curved pieces 702 and 704. The curved pieces 702 and 704 are preferably made of a metal material and the protective sleeves 706 and 708 are preferably made of a plastic or rubber material.

While particular embodiments have been chosen to illustrate the invention, it will be understood by those skilled in the art that various changes and modifications can be made therein without departing from the scope of the invention as defined in the appended claims.

What is claimed is:

1. An offshore cable assembly, comprising:
a plurality of conduits, each conduit supporting a plurality of cables, hoses, or combination thereof, each said conduit including a conduit body having an end and at least one longitudinal strength member embedded therein, said at least one longitudinal strength member extending substantially the length of said conduit body;
a plurality of end fittings configured to terminate said ends of each of said conduits, each of said end fittings having a mounting flange and an insert extension extending therefrom, and each of said insert extensions extending into each of said conduit bodies, respectively; and
a clamp securing together said plurality of conduits, said clamp including a plurality of first curved pieces and a plurality of second curved pieces corresponding to said first curved pieces and adapted to be fastened thereto such that each conduit body is captured between one of said first curved pieces and one of said second curved pieces.

2. An offshore cable assembly according to claim 1, wherein
each of said mounting flanges includes opposite sides that are substantially flat and opposite sides that are substantially curved and extending between said substantially flat sides, at least one of said substantially flat sides of one end fitting abuts at least one of said substantially flat sides of another end fitting.

3. An offshore cable assembly according to claim 1, wherein
a second longitudinal strength member is embedded in each of said conduit bodies.

4. An offshore cable assembly according to claim 3, wherein
said second longitudinal strength member is disposed opposite said at least one longitudinal strength member in each of said conduit bodies.

5. An offshore cable assembly according to claim 1, wherein
said plurality of cables, hoses, or a combination thereof includes a plurality of power cables and at least one ground conductor.

6. An offshore cable assembly according to claim 1, wherein
   said plurality of cables, hoses, or a combination thereof includes at least one of a fiber optic or coaxial electrical cable.

7. An offshore cable assembly according to claim 1, wherein
   each of said first curved pieces and each of said second curved pieces has a protective sleeve for engaging each conduit body, respectively, and each of said protective sleeves is formed of a rubber material.

\* \* \* \* \*